United States Patent
Voudouris et al.

(10) Patent No.: US 11,141,241 B2
(45) Date of Patent: Oct. 12, 2021

(54) SYSTEM AND METHOD OF MORE DIRECTLY VIBRATING AN ORTHOPEDIC-ORTHODONTIC DEVICE

(71) Applicant: Orthoarm, Inc., Toronto (CA)

(72) Inventors: John-Dean Voudouris, Toronto (CA); John Voudouris, Toronto (CA)

(*) Notice: Subject to any disclaimer, the term of this patent is extended or adjusted under 35 U.S.C. 154(b) by 0 days.

(21) Appl. No.: 15/777,466

(22) PCT Filed: Nov. 21, 2016

(86) PCT No.: PCT/CA2016/051362
§ 371 (c)(1),
(2) Date: May 18, 2018

(87) PCT Pub. No.: WO2017/083987
PCT Pub. Date: May 26, 2017

(65) Prior Publication Data
US 2018/0333225 A1    Nov. 22, 2018

Related U.S. Application Data

(60) Provisional application No. 62/257,965, filed on Nov. 20, 2015.

(51) Int. Cl.
A61C 7/00     (2006.01)
A61C 7/08     (2006.01)
A61C 19/06    (2006.01)
A61C 7/06     (2006.01)

(52) U.S. Cl.
CPC ............... *A61C 7/008* (2013.01); *A61C 7/06* (2013.01); *A61C 7/065* (2013.01); *A61C 7/08* (2013.01); *A61C 19/06* (2013.01)

(58) Field of Classification Search
CPC .......... A61C 7/06; A61C 7/065; A61C 7/008; A61C 7/08; A61C 9/06
See application file for complete search history.

(56) References Cited

U.S. PATENT DOCUMENTS

| | | | | |
|---|---|---|---|---|
| 4,123,844 A | * | 11/1978 | Kurz ..................... | A61C 7/008 433/5 |
| 4,244,688 A | * | 1/1981 | Kurz ..................... | A61C 7/06 433/5 |
| 4,348,177 A | * | 9/1982 | Kurz ..................... | A61C 7/06 433/5 |

(Continued)

FOREIGN PATENT DOCUMENTS

EP     0445492 A1    9/1991

*Primary Examiner* — Ralph A Lewis
(74) *Attorney, Agent, or Firm* — McMillan LLP

(57) ABSTRACT

The present invention relates to a method and system for applying localized vibration directly to particular teeth with the upper and lower jaws. A headgear using an inner bow comprising at least two arms that inserts into the upper first molars and an elastic-type headgear strap attaches to the back of the neck and to the outside, or outer bow also having at least two arms. The inner bow and outer bow are coupled together generally in the center (or alternatively with at least one lateral extension that is off-centered) by an external extension. The external extension may further have a protrusion, that inserts into a corresponding orifice within a vibrating orthodontic device.

5 Claims, 5 Drawing Sheets

(56) References Cited

U.S. PATENT DOCUMENTS

| | | | |
|---|---|---|---|
| 4,382,780 A * | 5/1983 | Kurz | A61C 7/06 |
| | | | 433/5 |
| 4,844,688 A | 7/1989 | Clough et al. | |
| 5,890,891 A * | 4/1999 | Doyle | A61C 7/06 |
| | | | 433/5 |
| 8,708,701 B2 | 4/2014 | Levens et al. | |
| 9,968,421 B2 * | 5/2018 | Bowman | A61C 7/008 |
| 2008/0227047 A1 | 9/2008 | Lowe et al. | |
| 2013/0252193 A1 | 9/2013 | Bowman et al. | |
| 2014/0023983 A1 * | 1/2014 | Lowe | A61C 7/006 |
| | | | 433/24 |
| 2014/0080082 A1 | 3/2014 | Lowe | |
| 2014/0186789 A1 | 7/2014 | Valoir | |
| 2014/0342300 A1 | 11/2014 | Schnaitter | |
| 2015/0079533 A1 | 5/2015 | Bowman | |
| 2015/0173857 A1 | 6/2015 | Lowe | |

\* cited by examiner

SYSTEM AND METHOD OF MORE DIRECTLY VIBRATING AN ORTHOPEDIC-ORTHODONTIC DEVICE

FIELD OF THE INVENTION

The present invention relates generally to a system and method for applying vibration to an orthopedic-orthodontic device and to affect jaw growth. More particularly, the present invention relates to a method and system for applying localized vibration directly to particular teeth.

BACKGROUND OF THE INVENTION

Vibrating devices attached to an upper mouthguard-like tray have been used in orthodontics to speed up treatment by stimulating bone forming and bone removing cells around teeth as described in U.S. Pat. No. 8,708,701; U.S. Patent Publication Nos. 2008/0227047; 2013/0252193; 2014/0023983; 2014/0080082; 2014/0186789; 2014/0342300; 2015/0079533; 2015/0125801; and 2015/0173857, all of which are herein incorporated by reference in their entirety. Secondly, vibrating devices have been reported to reduce patient discomfort in the teeth with orthodontic treatment. Up to 30-50 percent faster tooth movement has resulted with orthodontic braces or invisible-retainer aligner treatments with dental vibration devices.

A full semi-hard type of mouthguard material device that covers the upper and lower teeth and joins them together is also known as a positioner to detail the teeth after orthodontic treatment, or alternatively a clear, "invisible" plastic-type liner material.

It is important to distinguish tooth movement and jaw correction using two separate mechanisms of correcting malocclusions or poor bite relationships. Malocclusions can be corrected with dental movements assisted by vibration but they can also be corrected with jaw modification with direct vibration that has not been addressed using vibration.

SUMMARY OF THE INVENTION

According to one aspect of the invention, there is provided a headgear device with a centrally or at least one laterally located external extension and an attached internal protrusion is inserted into a vibrating device that transmits vibration to the upper first molars for more efficient first molar rotation and distalization and/or to reduce patient discomfort.

According to another aspect of the invention, there is provided functional appliances that position the lower jaw in a forward position has a centrally or at least one laterally located, external extension and an attached internal protrusion that is inserted into a vibrating device to transmit vibration to remodel the bone of the upper and lower jaw.

According to yet another aspect of the invention, there is provided a facemask for Class III underbite treatment that positions the upper jaw in a forward position has a centrally or at least one laterally located, external extension and an attached internal protrusion that is inserted into a vibrating device to transmit vibration to remodel the bone of the upper jaw in a forward direction.

According to another aspect of the invention, there is provided a chin-cup headgear appliance for Class III underbite treatment that is applied to a strongly growing lower jaw to restrict the lower jaw growth has a centrally or at least one laterally located, external extension and an attached internal protrusion that is inserted into a vibrating device to transmit vibration to remodel the bone of the upper and lower jaw.

According to yet another aspect of the invention, there is provided a positioner that details the teeth usually following orthodontic treatment, has a centrally or at least one laterally located external extension, and an attached internal protrusion that is inserted into a vibrating device to transmit the vibration to remodel the bone of the upper and lower jaw.

According to another aspect of the invention, there is provided a removable retainer that straightens the teeth usually during orthodontic treatment, has a centrally or at least one laterally located external extension, and an attached internal protrusion that is inserted into a vibrating device to transmit vibration to remodel the bone of the upper and lower teeth and jaws.

BRIEF DESCRIPTION OF THE DRAWINGS

An embodiment will now be described, by way of example only, with reference to the attached figures, wherein.

DETAILED DESCRIPTION OF THE EMBODIMENT

It is an object of this invention to at least provide a novel method and system for applying localized vibration directly to particular teeth and jaws. This invention seeks to extend the benefits of vibration to orthopedic devices such as headgear for patients with large overjets resulting from a small lower jaw size or large protrusive upper jaw, or a combination thereof as in a Class II skeletal malocclusion for example. It may also be useful in orthopedic reverse-pull headgears using a facemask-type headgear in Class III underbite treatments. The headgear and Class II functional appliance are two of the most used orthopedic appliances during reverse-pull. Facemasks are also more commonly used along with retainers, than other positioners, or chin cups.

Figure 1:
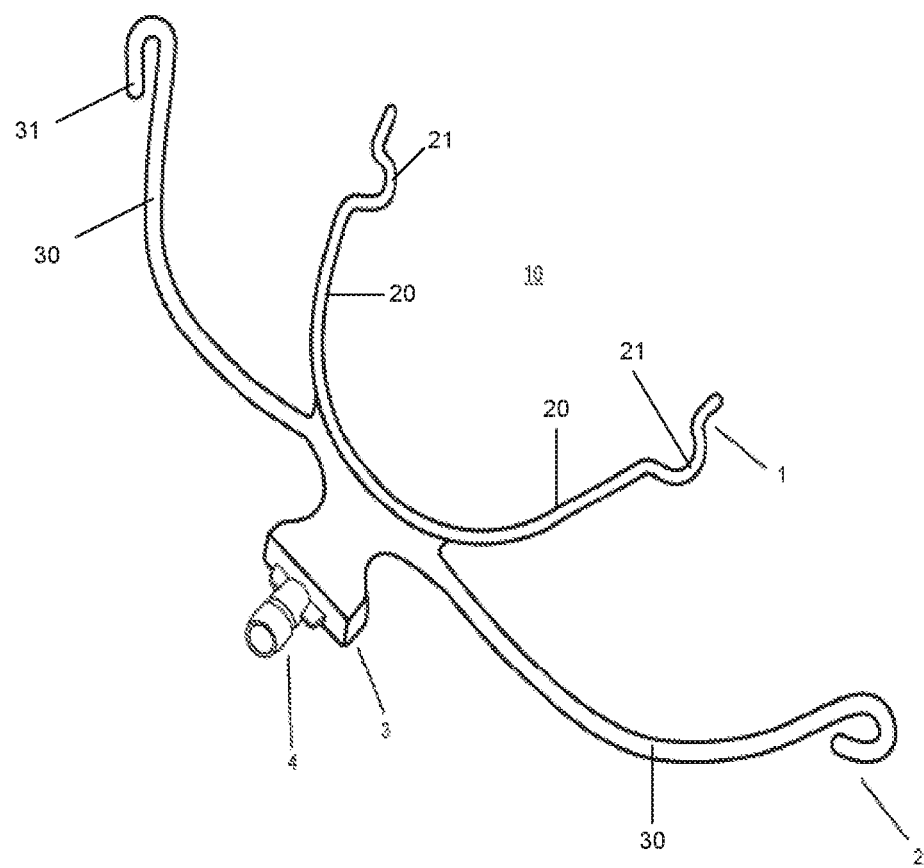
FIG. 1 is a top perspective view of a headgear.
Figure 2:
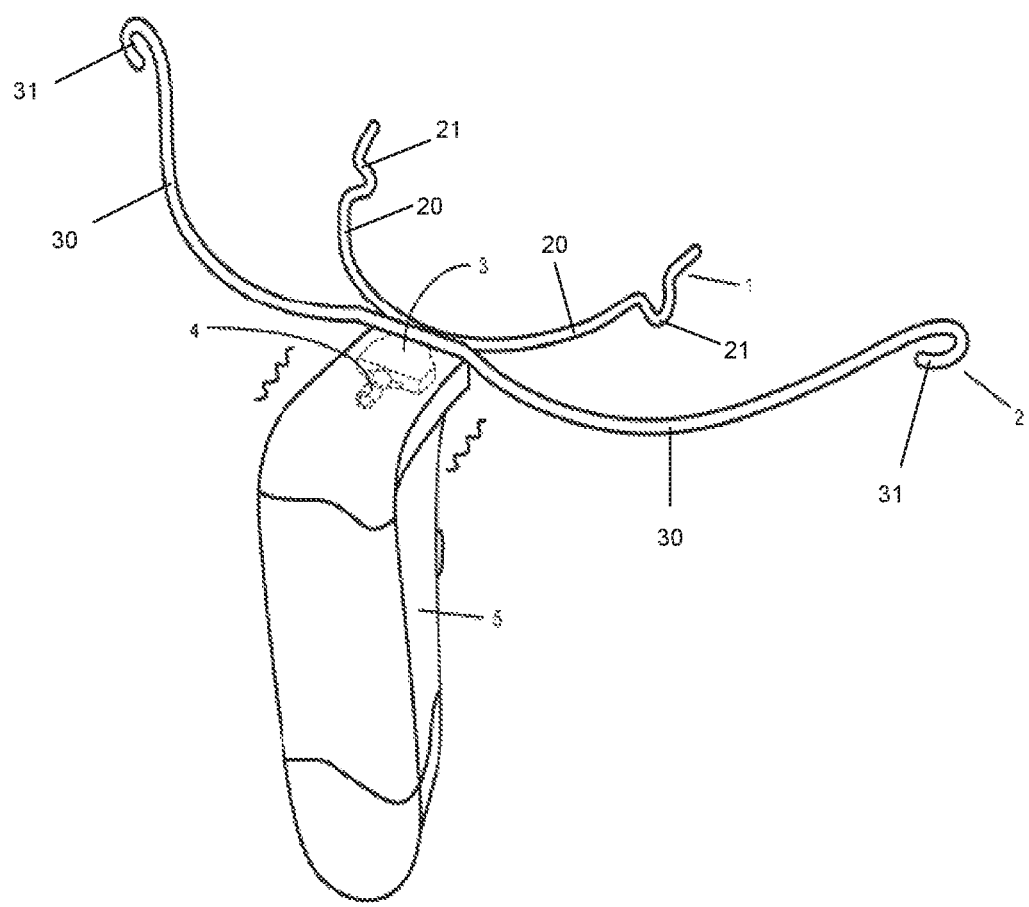
FIG. 2 is a top perspective view of the headgear coupled to a vibrating device.
Figure 3:
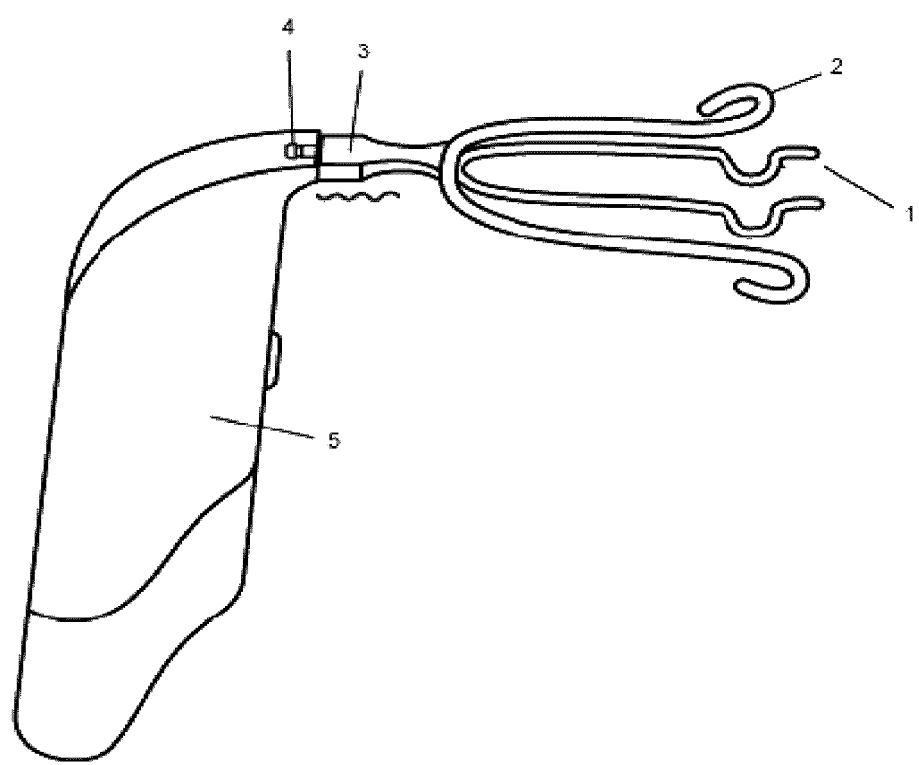
FIG. 3 is a side perspective view of the headgear coupled to the vibrating device.

As depicted in FIGS. 1 to 3, orthopedic treatment headgear 10 includes an inner bow 1 comprising at least two molar arms 20 that insert into the upper first molars (not shown). The two molar arms 20 each has a curved portion 21 near a distal end thereof. The headgear 10 also comprises an elastic-type headgear strap (not shown) attached to the outside, or outer bow 2 also having at least two arms 30 each ending in a hooked end 31 at a distal end thereof. The headgear 10 with elastic strap, which often goes around the back of the neck or top of the head for anchorage, is used to restrict further upper jaw growth. The inner bow 1 and outer bow 2 are coupled together generally at the center (or alternatively off-center laterally) by at least one external extension 3. The external extension 3 may further have a protrusion 4 that inserts into a corresponding orifice within a vibrating orthodontic device 5. Alternatively, the external extension 3 may have another type of attachment for coupling the vibrating orthodontic device 5 to the inner bow 1.

The orthopedic headgear 10 allows the lower jaw to continue to grow forward in patients that have a small lower jaw or receding chin in a Class II jaw relationship, as the upper jaw is restricted for relative correction of the overjet and skeletal dysplasia of the jaws.

There is an indication to vibrate the headgear 10 in order to move the upper first molars by applying a vibrating device 5 connected to the orthopedic headgear 10 using a protrusion 4. In contrast to prior art vibrating devices which only direct the vibrating forces through a mouthguard-like tray directly to the teeth, the present orthopedic headgear 10 localizes the vibration directly to the upper first molars for faster molar movement in a posterior (distal) direction, in addition to rotating them distally. The vibrating forces generated by the vibrating device 5 are transmitted to the upper first molars more directly via the inner bow 1. There is also an indication that the vibration may also reduce patient discomfort with orthopedic headgear treatment that is often painful for patients.

The vibration of the orthopedic Class II correction headgear 10 may also affect the restriction of the upper jaw itself since vibration increases bone-removing cells in the dental regions and thus the vibration may act similarly in the skeletal jaw bone region.

This vibration in the upper jaw and molar region may also refer vibration to the lower jaw growth center called the condyle where bone forming cells are modified positively to possibly permit the lower jaw to grow forward.

A facemask (shown in FIG. 4) to advance the upper jaw, or a chin-cup orthopedic headgear device 10 to restrict the lower jaw (as part of the facemask shown), may also be used to correct a Class III underbite relationship, where the vibrating device 5 may be attached to each appliance used separately to produce faster orthopedic treatment and less discomfort. The Class III correction may be facilitated by activating upper jaw bone-forming cells by advancing the upper jaw with facemask therapy, and conversely restricting bone forming cells in the lower jaw with chin-cup therapy.

The external attachment 3 and internal protrusion 4 may be made of metal for the headgear 10 and may also be made of the semi-rigid mouthguard-like material, polyurethane, acrylic, or other materials for the functional appliance, facemask, chin-cup, retainers, and positioner.

Overall, headgears 10, that are high-pull, low-pull, straight-pull (combination of the latter), Class II Functional appliances, Facemasks, Chin-cups, Retainers may also have external extensions and internal protrusions located centrally or laterally thereon to allow vibration similarly.

Although the embodiments herein describe the extension 3 being used on the headgear 10, the same type of extension 3 may be used in the prior art positioner to attach to the vibrating device 5.

In yet another embodiment, in the case of patients with a small lower jaw the bite may be taken with the lower jaw in the forward edge-to-edge incisors position to make a type of specialized positioner called a functional appliance. In a functional appliance the vibration may assist in modifying the bone forming cells at the lower jaw growth centre called the condyle. Other functional appliances that allow the lower jaw to separate from the upper and thereby open and close more freely, may also benefit from direct placement of the vibrator 5 more closely and directly to the jaws. This is distinct from prior art appliances that direct the forces to the dental arches and the teeth though the dental arch, and where the mouthguard material is being vibrated.

Figure 4:
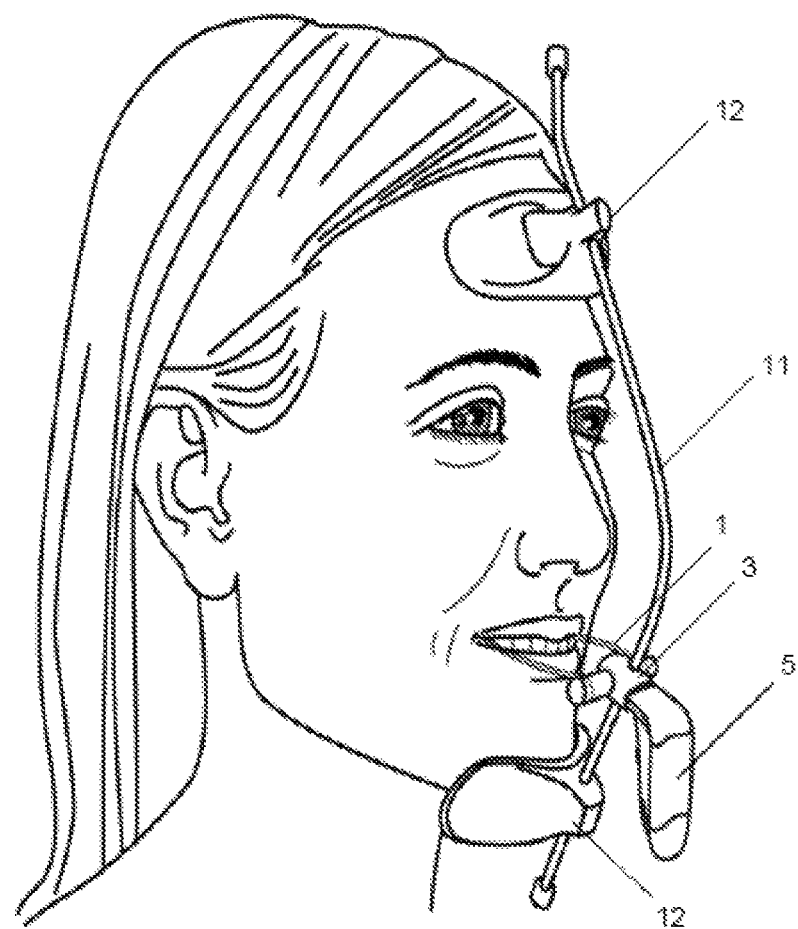
FIG. 4 is a side perspective view of a facemask coupled to the vibrating device.

With reference to FIG. 4, the Class III facemask headgear device is shown anchored to a human face by means of vertical bow 11 and forehead and chin anchors 12. Forehead and chin anchors 12 may be adhered to the forehead and chin by adhesive means. Alternatively (not shown), the anchors may be strapped around the head. Vertical bow 11 may be connected to vibration device 5 by suitable means at a generally central region thereof. Vertical bow 11 may be connected to anchors 12 at distal ends thereof. Vibrating device 5 may be held by the inner bow 1 directly and the vertical bow 11 indirectly in front of a patient's mouth such that inner bow 1 may engage the upper first molars using two stretched elastics to the upper molars bilaterally.

Figure 5:
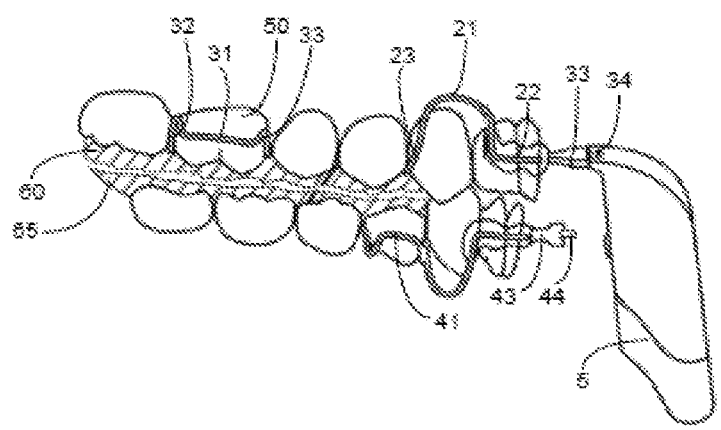
FIG. 5 is a side view of the headgear coupled to the vibrating device and applying vibration to an upper first molar tooth.

Turning now to FIG. 5, which is a side sectional view showing the vibrating device 5 applied to a functional appliance composed of two acrylic retainers, an upper retainer 60 and a lower retainer 65. Vibrating device 5 is connected to the functional appliance via an upper extension 33 and an upper protrusion 34 as described earlier. A first upper bow portion 21 has a first end 22 connected with the upper extension 33, and has a second end 23 engaging into the acrylic upper retainer 60. This engagement serves to transmit vibration along the acrylic upper retainer 60 (cross-hatched) for transmitting vibrations produced by the vibrating device 5 to the upper first molar 50, via a second upper bow portion 31 which engages the upper first molar 50 and is engaged into the upper retainer 60 at the ends 32 and 33 thereof. Similarly, the vibrating device 5 can be connected to the functional appliance via a lower extension 43 and a lower protrusion 44 of the lower acrylic retainer 65 of the functional appliance for transmitting vibrations to a lower bow portion 41, as shown.

The above-described embodiments are intended to be examples of the present invention and alterations and modifications may be effected thereto, by those of skill in the art, without departing from the scope of the invention, which is defined solely by the claims appended hereto.

The invention claimed is:

1. An orthopedic treatment apparatus, comprising:
   a vibrating orthodontic device having an orifice;
   a functional appliance comprising:
      a first retainer; and
      a second retainer;
   a first upper bow portion having a first end, and a second end engaging into the first retainer;
   an upper extension connected with the first end of the first upper bow portion, and having an upper protrusion sized to fit into the orifice for coupling the vibrating orthodontic device to the upper bow portion;
   a second upper bow portion for engagement with an upper tooth and having a first end and a second end each engaged into the first retainer;
   a lower bow portion having a first end, and a second end engaging into the second retainer;
   a lower extension connected to the lower bow portion, and having a lower protrusion sized to fit into the orifice for coupling the vibrating orthodontic device to the lower bow portion;
   wherein the vibrating orthodontic device is positioned in front of a patient's mouth such that vibrating forces generated by the vibrating orthodontic device are transmitted to the first upper bow portion then into the first retainer then to the second upper bow portion and then to the upper tooth when the orifice is connected to the upper protrusion and
   wherein said vibrating device is adapted to connect to the upper extension to engage the first retainer and
   wherein said vibrating device is adapted to connect to the lower extension to engage the second retainer.

2. The orthopedic treatment apparatus of claim 1, wherein the upper extension and upper protrusion are made of metal.

3. The orthopedic treatment apparatus of claim 1, wherein the upper extension and upper protrusion are made of a semi-rigid material.

4. The orthopedic treatment apparatus of claim 3, wherein the semi-rigid material is one of: polyurethane and acrylic.

5. The orthopedic treatment apparatus of claim 1, wherein the functional appliance transmits vibrations to at least one of: the lower bow portion and the upper bow portion.

* * * * *